No. 795,563. PATENTED JULY 25, 1905.
L. B. TRUESDELL.
TROUSERS CREASER.
APPLICATION FILED MAR. 1, 1905.
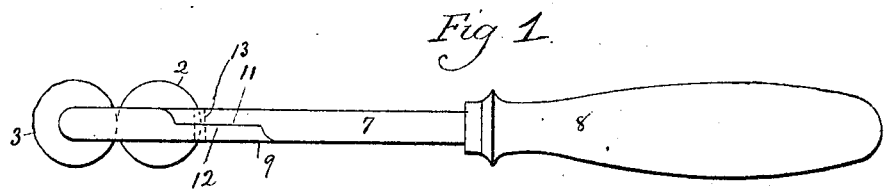
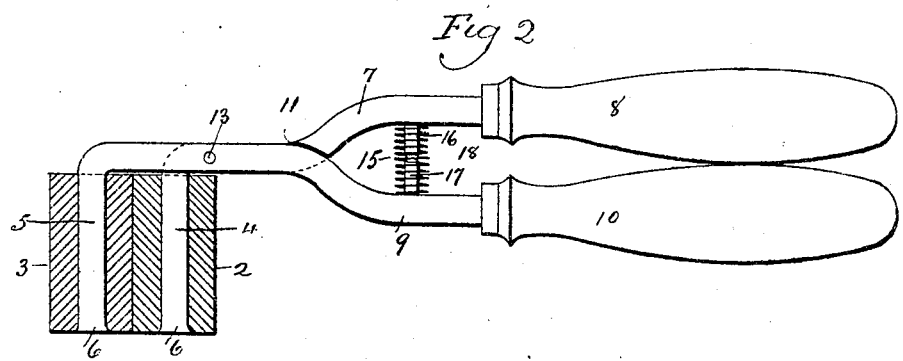
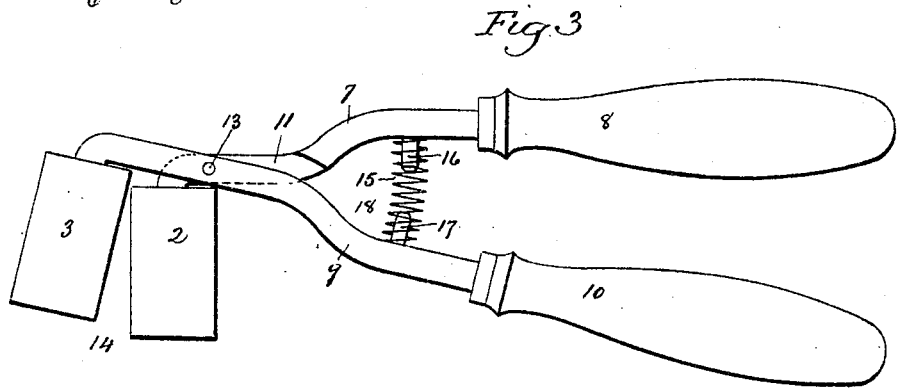

UNITED STATES PATENT OFFICE.

LUCIUS BEECHER TRUESDELL, OF NAUGATUCK, CONNECTICUT, ASSIGNOR OF ONE-HALF TO ALBERT F. HASSLINGER, OF NAUGATUCK, CONNECTICUT.

TROUSERS-CREASER.

No. 795,563.      Specification of Letters Patent.      Patented July 25, 1905.

Application filed March 1, 1905. Serial No. 247,880.

*To all whom it may concern:*

Be it known that I, LUCIUS BEECHER TRUESDELL, a citizen of the United States, residing at Naugatuck, in the county of New Haven and State of Connecticut, have invented a new and useful Improvement in Trousers-Creasers; and I do hereby declare the following, when taken in connection with the accompanying drawings and the numerals of reference marked thereon, to be a full, clear, and exact description of the same, and which said drawings constitute part of this specification, and represent, in—

Figure 1, a plan view of a trousers-creaser constructed in accordance with my invention; Fig. 2, a view thereof in side elevation with the rollers in section, the device being shown as closed; Fig. 3, a view of the device in side elevation with the handles separated for the formation of a V-shaped opening between the rollers.

My invention relates to an improvement in portable devices for creasing the trousers, the object being to produce at a low cost for manufacture a simple, convenient, and effective creasing implement requiring no skill for its operation and adapted to be stowed away in a hand-bag or suit-case.

With these ends in view my invention consists in a trousers-creaser having certain details of construction, as will be hereinafter described, and pointed out in the claims.

In carrying out my invention, as herein shown, I employ two cylindrical rollers 2 3, corresponding to each other in diameter and in length and respectively mounted so as to turn freely upon spindles 4 and 5, the outer ends of which are swaged to form heads 6 for the retention of the said rollers, which may, however, be held in place in some other way. The said spindle 4 forms a part of and is bent at a right angle to the outer end of a shank 7, the inner end of which is furnished with a handle 8, while the said spindle 5 forms a part of and is bent at a right angle to the outer end of a relatively long shank 9, furnished with a handle 10. The shank 7 has the inner face of its forward end cut away to form a recess 11, which extends outward to the spindle 4. The long shank 9 has its inner face correspondingly cut away to form a recess 12, whereby the two shanks are adapted to be set into each other, as it were, to form a joint which is completed by means of a pivot-pin 13, which is located at a right angle to the axes of the said spindles and passes through the short shank 7 at a point very near the outer end thereof and through the shank 9 at a point some distance back from the outer end thereof. The shanks are thus differentially pivoted together at a point eccentric to the spindles of the rollers, which are thus caused to separate rapidly when the handles are moved apart. When that is done, an unsymmetrical V-shaped opening 14 is produced between the rollers 2 and 3 for the reception of the material forming the fold to be creased. Normally the handles and rollers are separated, as shown in Fig. 4, by means of a coiled spring 15, the ends of which are set over alined pins 16 and 17, projecting inwardly toward each other from the inner ends of the two shanks; but of course a different spring might be employed or a spring might be dispensed with altogether. The said pins and spring are located in a space 18, formed between the inner ends of the shanks by bending them outwardly away from each other, beginning, as herein shown, about at the inner ends of the recesses 11 and 12, already described.

In making use of the device its rollers are first heated in any convenient manner. A gas-jet or a lamp will answer the purpose. The implement is now applied to the trousers, the fold to be creased being inserted into the V-shaped opening produced between the rollers by their separation. The hand holding the implement is now closed upon the handles, which are drawn together with the effect of contracting the said opening and pinching the fabric between the rollers, the pressure being the greatest in the narrowest part of the opening, where the actual fold of the fabric occurs. The implement is now drawn over the fold in the fabric, causing the rollers to be revolved and a sharp crease to be produced; but no crease is formed in the material at the outer end of the opening, which is large enough to accommodate the material without enough pressure to crease it.

It is apparent that in carrying out my invention some changes from the construction herein shown and described may be made. I would therefore have it understood that I do not limit myself thereto, but hold myself at liberty to make such departures therefrom as fairly fall within the spirit and scope of my invention.

Having fully described my invention, what I claim as new, and desire to secure by Letters Patent, is—

1. In a trousers-creaser, the combination with two rollers, of spindles upon which the same are mounted, and pivotal connection for the said spindles located at a right angle to their axes, whereby when they are swung apart a V-shaped opening is formed between the rollers.

2. In a trousers-creaser, the combination with a long and a short shank, each provided at its inner end with a handle and each having its outer end formed with a spindle, and the said shanks being pivoted together by a pivot located at a right angle to the axes of the said spindles and passing through the said shank at a point closer to the outer end of the short shank than to the outer end of the long shank; of rollers mounted upon the said spindles and forming a V-shaped opening between them when the inner ends of the said shanks are swung apart.

3. In a trousers-creaser, the combination with a long and a short shank having their inner ends provided with handles, and their outer ends formed with spindles and pivoted together by a pivot located at a right angle to the axes of the said spindles and passing through the said shanks at a point nearer the outer end of the short shank than the outer end of the long shank; of rollers mounted upon the said spindles, and a spring interposed between the two shanks for normally separating the rollers.

In testimony whereof I have signed this specification in the presence of two subscribing witnesses.

LUCIUS BEECHER TRUESDELL.

Witnesses:
JOSEPH NEAL,
WILLIAM P. J. KEILTY.